(12) United States Patent
Sokola et al.

(10) Patent No.: US 8,780,537 B2
(45) Date of Patent: Jul. 15, 2014

(54) INTEGRATED CONNECTION SYSTEM FOR AN ELECTRONIC DEVICE

(75) Inventors: Raymond L. Sokola, Perkasie, PA (US); Bruce Foster Bishop, Aptos, CA (US); Hiroshi Shirai, Kawasaki (JP); Kazukiyo Osada, Kawasaki (JP)

(73) Assignees: Tyco Electronics Corporation, Berwyn, PA (US); Tyco Electronics Japan G.K. (JP)

( * ) Notice: Subject to any disclaimer, the term of this patent is extended or adjusted under 35 U.S.C. 154(b) by 339 days.

(21) Appl. No.: 12/775,977

(22) Filed: May 7, 2010

(65) Prior Publication Data
US 2011/0273819 A1    Nov. 10, 2011

(51) Int. Cl.
*H05K 5/00* (2006.01)
*H05K 7/00* (2006.01)
*G06F 1/16* (2006.01)

(52) U.S. Cl.
CPC ............ *G06F 1/1613* (2013.01); *G06F 1/1626* (2013.01); *G06F 1/1643* (2013.01)
USPC ............ 361/679.02; 361/679.01; 361/679.21; 361/679.3; 361/679.56

(58) Field of Classification Search
CPC ....... G06F 1/16; G06F 1/1607; G06F 1/1613; G06F 1/1626; G06F 1/1633; G06F 1/1643; G06F 1/1684
USPC ............... 361/679.01, 679.21, 679.3, 679.56, 361/679.02
See application file for complete search history.

(56) References Cited

U.S. PATENT DOCUMENTS

| 5,543,588 | A  | 8/1996 | Bisset et al. |
| 6,380,930 | B1 | 4/2002 | Van Ruymbeke |
| 6,853,368 | B2 | 2/2005 | Muthuswamy et al. |
| 7,046,230 | B2 | 5/2006 | Zadesky et al. |
| 7,080,787 | B2 | 7/2006 | Wulff et al. |
| 7,088,294 | B2 | 8/2006 | Qi et al. |
| 7,181,172 | B2 | 2/2007 | Sullivan et al. |
| 7,202,825 | B2 | 4/2007 | Leizerovich et al. |
| 7,231,236 | B2 | 6/2007 | Cho |

(Continued)

FOREIGN PATENT DOCUMENTS

| EP | 1 798 635 A1 | 6/2007 |
| EP | 2 083 555 A2 | 7/2009 |

(Continued)

OTHER PUBLICATIONS

International Search Report, International Application No. PCT/US2011/000760, International Filing Date Feb. 5, 2011.

*Primary Examiner* — Anthony Haughton (57) ABSTRACT

An electronic device includes a frame having a frame member with a frame connector. The frame defines a component cavity. The electronic device also includes a user interface coupled to the frame that is visible external of the frame, with the user interlace displaying data to an operator. A user input is coupled to the frame member and includes a terminal electrically coupled to the frame connector. A circuit board is received in the component cavity and is operably coupled to the user interface. The circuit board is electrically connected to the frame connector at a separable interface. The user input can pick up a signal from anywhere on the electronic device based on an action of touching, handling or placing and process that signal to cause a predetermined effect. The signal from the user input is transferred to the user interface via the frame connector and the circuit board.

23 Claims, 4 Drawing Sheets

(56) References Cited

U.S. PATENT DOCUMENTS

| | | |
|---|---|---|
| 7,333,062 B2 | 2/2008 | Leizerovich et al. |
| 7,341,170 B2 | 3/2008 | Boone |
| 7,383,067 B2 | 6/2008 | Phillips et al. |
| 7,468,702 B2 | 12/2008 | Leizerovich et al. |
| 7,595,788 B2 | 9/2009 | Son |
| 7,605,766 B2 | 10/2009 | Dahlstrom et al. |
| 7,928,965 B2 | 4/2011 | Rosenblatt et al. |
| 8,339,372 B2 | 12/2012 | Rofougaran |
| 8,390,481 B2 | 3/2013 | Pance et al. |
| 8,406,806 B2 | 3/2013 | Wong |
| 2003/0094697 A1 | 5/2003 | Higashida et al. |
| 2005/0036273 A1 | 2/2005 | Rastegar et al. |
| 2005/0041624 A1* | 2/2005 | Hui et al. ............ 370/335 |
| 2006/0197750 A1 | 9/2006 | Kerr et al. |
| 2006/0197753 A1 | 9/2006 | Hotelling |
| 2006/0217058 A1 | 9/2006 | Staszesky et al. |
| 2008/0100568 A1 | 5/2008 | Koch et al. |
| 2008/0236632 A1* | 10/2008 | D'Urso et al. ............ 134/32 |
| 2009/0135142 A1 | 5/2009 | Fu et al. |
| 2009/0256759 A1* | 10/2009 | Hill et al. ............ 343/702 |
| 2009/0257189 A1 | 10/2009 | Wang et al. |
| 2010/0013775 A1 | 1/2010 | Son |
| 2010/0035671 A1 | 2/2010 | Lee et al. |
| 2010/0061055 A1* | 3/2010 | Dabov et al. ............ 361/679.56 |
| 2010/0156818 A1 | 6/2010 | Burrough et al. |
| 2010/0245265 A1 | 9/2010 | Sato et al. |
| 2010/0321325 A1 | 12/2010 | Springer et al. |
| 2011/0038114 A1 | 2/2011 | Pance et al. |
| 2011/0164365 A1* | 7/2011 | McClure et al. ............ 361/679.3 |
| 2011/0267244 A1 | 11/2011 | Rajgopal et al. |
| 2011/0273819 A1 | 11/2011 | Sokola et al. |
| 2012/0009983 A1 | 1/2012 | Mow et al. |

FOREIGN PATENT DOCUMENTS

| | | |
|---|---|---|
| EP | 2 177 968 A1 | 4/2010 |
| JP | 2001-168554 | 6/2001 |
| JP | 2009-130283 | 6/2009 |
| WO | WO 2004/112358 A1 | 12/2004 |

* cited by examiner

INTEGRATED CONNECTION SYSTEM FOR AN ELECTRONIC DEVICE

BACKGROUND OF THE INVENTION

The subject matter herein relates generally to electronic devices, and more particularly, to an integrated connection system for an electronic device.

There exist today many types of consumer electronic devices, each of which utilizes electrical components such as user inputs, user interfaces, operating components, and the like. One or more circuit boards are provided within a frame or housing, where the circuit boards are connected to the user input, the user interface and/or the operating components. The user interface typically includes an output device in the form of a fixed display, such as an LCD that presents visual information such as text and graphics. The user inputs typically include components which can be mechanically actuated, such as, for example, switches, buttons, keys, dials, joysticks, navigation pads, or which can be electrically activated, such as, for example, touch pads, touch sensors and touch screens. The user inputs are typically configured to perform operations such as issuing commands, making selections or moving a cursor in the consumer electronic device. The operating components typically do not require user interaction, but rather function to operate the electronic device in a particular way, such as power sources, antennas, LEDs, and the like. Examples of such hand-held electronic devices include mobile phones, PDAs, laptops, tablet PCs, netbooks, e-readers, remote controls, various media and game players, and other navigation and communication devices.

The electronic devices have considerations such as size and shape limitations, costs, functionality, complexity, and the like that must be taken into account when designing the consumer electronic device. In most cases, the user interlace is positioned on the front face of the electronic device for easy viewing of the display and easy manipulation of the input devices. However, electronic devices are not without disadvantages. For example, numerous user inputs are required for multi-functionality of the electronic device. Each of the user inputs needs to be mounted to the circuit board, and the real estate on the circuit board is consumed by the multitude of user inputs connected thereto. There is an ongoing trend toward making electronic devices smaller; however, the size limitations are driven by the number of components on the circuit board. Additionally, interconnections between the circuit boards and the user inputs, the user interface and/or the operating components are typically made by reflow soldering to the circuit board or soldering wires to the circuit board. As such, the circuit boards are limited to use of components that are capable of being soldered. Additionally, the assembly of such components is time consuming and difficult.

A need remains for an electronic device that may be manufactured in a cost effective and reliable manner. A need remains for an electronic device that may be constructed with consideration toward size and shape limitations, costs, functionality, complexity, and the like.

BRIEF DESCRIPTION OF THE INVENTION

In one embodiment, an electronic device is provided that includes a frame having a frame member with a frame connector. The frame defines a component cavity configured to receive a circuit board. The frame connector is configured to be coupled to a circuit board at a separable interface. The frame is configured to support a user interface that is visible external of the frame to display data to an operator. A user input coupled to the frame member and includes a terminal electrically coupled to the frame connector, wherein a signal from the user input is transferred to the user interface via the frame connector.

In another embodiment, an electronic device is provided including a frame having a frame member with a base and a rim extending from the base. The rim defines sidewalls of the frame and the frame has a component cavity bounded by the base and the rim. The frame has a frame connector on at least one of the base or the rim. A user interface is coupled to the frame member. The user interface has a display and a touch cover overlaying the display. The display is visible through the touch cover external of the frame and is configured to display data to an operator. The touch cover defines a user input having a terminal electrically connected to the frame connector. A circuit board is received in the component cavity that is operably coupled to the user interface. The circuit board is electrically connected to the frame connector at a separable interface. A signal from the user input is transferred to the circuit board via the frame connector.

In a further embodiment, an electronic device is provided that includes a frame having a frame member with a base and a rim extending from the base. The rim defines side walls of the frame and the frame has a component cavity hounded by the base and the rim. The frame has a frame connector on at least one of the base or the rim. A tactile sensor is coupled to at least one of the base or the rim of the frame member. The tactile sensor includes a transducer and a terminal electrically connected to the frame connector. A circuit board is received in the component cavity that is electrically connected to the frame connector at a separable interface. Input from the tactile sensor is transferred to the circuit board via the frame connector.

DETAILED DESCRIPTION OF THE INVENTION

Figure 1:
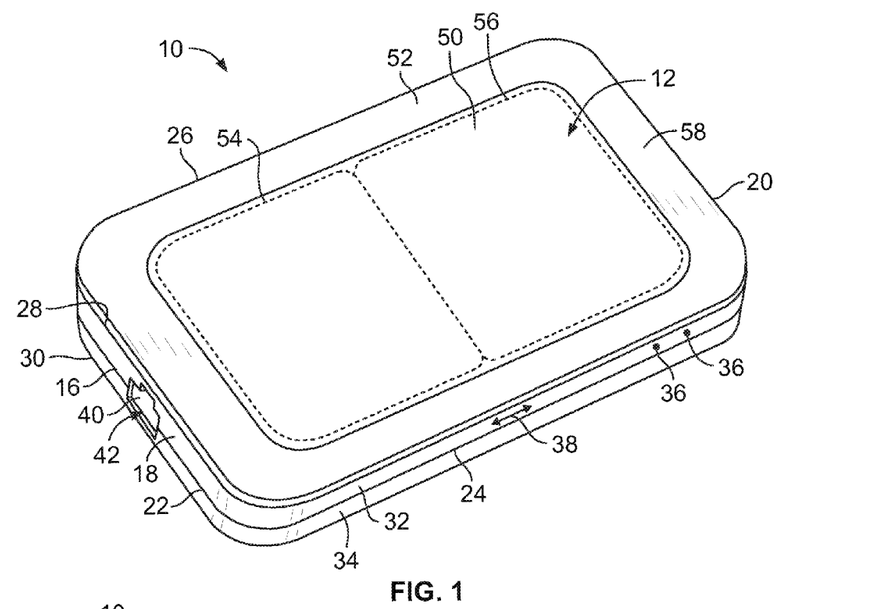
FIG. 1 illustrates an electronic device formed in accordance with an exemplary embodiment.

FIG. 1 illustrates an electronic device 10 formed in accordance with an exemplary embodiment. The electronic device 10 represents a handheld consumer electronic device having a user interface 12 and one or more user inputs 14 (shown in FIG. 2). The user interface 12 is configured to display data to an operator. The user inputs 14 are manipulated by the operator to control the display and functionality of the electronic device 10. The electronic device 10 constitutes a mobile phone in the illustrated embodiment. However, the subject matter herein is not intended to be limited to such mobile phones. For example, the subject matter herein may be used with other types of handheld electronic devices, such as PDA's, laptops, tablet PCs, notebooks, e-readers, remote controls, media players, game players, and other navigation and communication devices. Such electronic devices may include different functionality and thus have different user inputs than the user inputs 14 illustrated and described herein. As such, the electronic device 10 is merely illustrative of an exemplary embodiment incorporating an integrated connection system for the electronic device 10, as described in further detail below.

The electronic device 10 includes a frame 16 that defines the structural frame of the electronic device 10. The frame 16 has an outer surface 18 that configured to be held by an operator during use of the electronic device 10. The outer surface 18 defines an outer perimeter having a top 20, a bottom 22 opposite the top 20, and opposite sides 24, 26. The frame 16 also includes a front 28 and a back 30. The user interface 12 is coupled to the front 28 of the frame 16. In an exemplary embodiment, the frame 16 includes an upper frame member 32 and a lower frame member 34 that are coupled together. Optionally, indicia 36, 38 may be provided on the outer surface 18 of the frame 16. For example, the indicia 36, 38 may be provided on the side 24. Other indicia may be provided on other portions of the outer surface 18. In the illustrated embodiment, the indicia 36 represent volume controls for the electronic device 10. For example, two dots are provided, with the first dot representing a volume up button and the second dot representing a volume down button. The indicia 38 represents a slider or scroll button. For example, the indicia 38 may include a double-sided arrow indicating to the operator that the operator may slide his/her finger along the outer surface 18 in the vicinity of the indicia 38. A corresponding user input 14 is provided proximate to the indicia 38. Similarly, one or more user inputs 14 may be provided proximate to the indicia 36.

The electronic device 10 includes a mating connector 40 provided at the bottom 22. The mating connector 40 includes a mating interface 42 configured to mate with a corresponding connector (not shown). In the illustrated embodiment, the mating connector 40 is represented by a micro-USB connector. The mating connector 40 may be used for connection to a power, data, or audio input. The mating interface 42 is accessible through the bottom 22. Other types of mating connectors may be provided in alternative embodiments. The mating connector 40 may be provided in other locations along the outer surface 18 of the frame 16. For example, a headphone jack may be provided in a location along the outer surface 18 for receiving headphones. Optionally, an external antenna (not shown) may be provided along the outer surface 18 of the frame 16. Other types of mating connectors and components may be incorporated in the electronic device 10 in alternative embodiments.

The user interface 12 is coupled to the front 28 of the frame 16. The user interface 12 includes a display 50 and touch cover 52. The touch cover 52 may be separate from, and overlaid over, the display 50. For example, the display 50 may be provided internal of the frame 16 and the touch cover 52 may overlay the front 28 of the frame 16. The touch cover 52 may be transparent to allow the display 50 to he visible through the touch cover 52, For example, the touch cover 52 may be manufactured from a glass or plastic material that is transparent.

In an exemplary embodiment, the touch cover 52 constitutes a touchscreen configured to sense a touch event by the operator. As such, the touch cover 52 constitutes a user input 14. Optionally, substantially the entire area of the touch cover 52 may be touched by the operator to control the functionality of the electronic device 10. Alternatively, the touch cover 52 may be segmented into one or more user input area(s) 54 and one or more display area(s) 56. The user input area 54 represents the area of the touch cover 52 that may be touched by the operator to control the electronic device 10. The display area 56 may represent the portion of the touch cover 52 that displays data to the operator. The relative sizes of the user input area 54 and the display area 56 may change depending on the mode of operation of the electronic device 10 and/or the functionality allowed by the electronic device 10.

Optionally, the user input area 54 and display area 56 may at least partially overlap such that different data may be displayed in the user input area 54, such as to indicate to the operator different touch areas within the user input area 54. For example, different icons may be displayed in the user input area 54 indicating the particular zone within the user input area 54 that the operator is required to touch to perform a certain operation. The operator may touch a particular location in the user input area 54 to control the functionality of the electronic device 10. The operator may slide his/her finger along the touch cover 52 in the user input area 54 to control the functionality of the electronic device 10. Other types of touch events and movements of the operator finger may control the functionality of the electronic device 10.

In an exemplary embodiment, the user input area 54 and the display area 56 are bounded by a border 58 of the touch cover 52. Optionally, the border 58 may have a substantially uniform thickness around the perimeter of the touch cover 52. The border 58 covers a portion of the front 28 of the frame 16. The border 58 may be transparent, or alternatively, may be translucent or opaque. The border 58 may be painted or coated. A separate component, such as a cover, may be coupled to the touch cover 52 to define the border 58.

Figure 2:
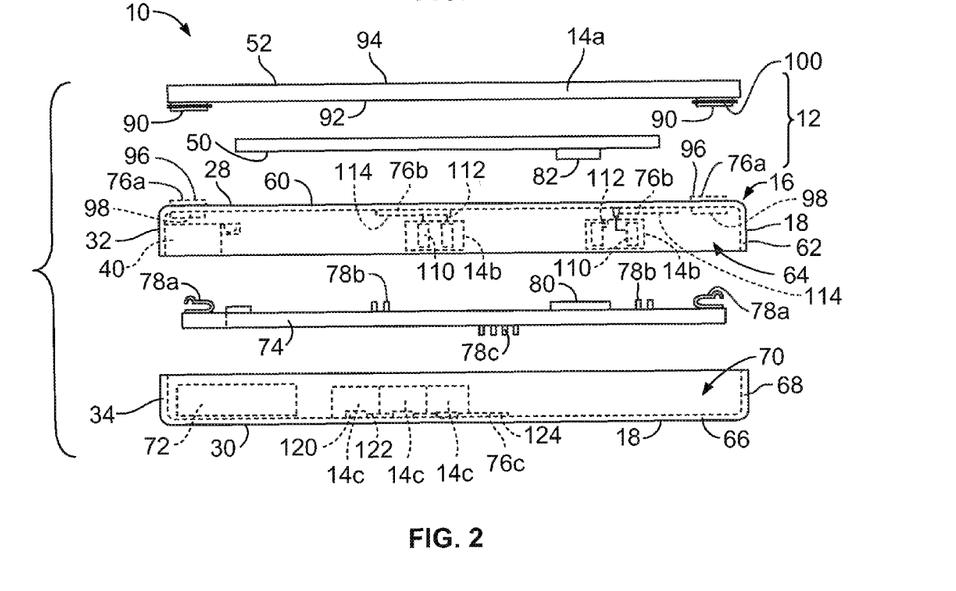
FIG. 2 is an exploded view of the electronic device.

FIG. 2 is an exploded view of the electronic device 10. The upper frame member 32 includes a base 60 and a rim 62 extending from the base 60. The rim 62 defines sidewalls of the frame 16. The upper frame member 32 has a component cavity 64 bounded by the base 60 and the rim 62. Similarly, the lower frame member 34 includes a base 66 and a rim 68 extending from the base 66. The rim 68 defines sidewalls of the lower frame member 34. The lower frame member 34 has a component cavity 70 bounded by the base 66 and the rim 68. The base 60 defines the front 28 of the frame 16. The base 66 defines the back 30 of the frame 16. The rims 62, 68 engage one another when the frame 16 is assembled such that rims 62, 68 define the top 20, bottom 22, side 24 and side 26 (each shown in FIG. 1). When the upper and lower frame members 32, 34 are coupled together, the component cavities 64, 70 are open to one another and define a larger component cavity of the frame 16. The rims 62, 68 engage one another to define sidewalls of the frame 16.

The upper and lower frame members 32, 34 are shown separated from one another. The component cavities 64, 70 receive electronic components of the electronic device 10 therein. For example, the component cavities 64, 70 receive the user inputs 14 and the mating connector 40. The component cavities 64, 70 may also receive a battery pack 72, such as in the component cavity 70 of the lower frame member 34. The electronic device 10 includes a circuit board 74 that is received in the component cavity 64 of the upper frame member 32 and/or the component cavity 70 of the lower frame member 34. The electronic device 10 may include more than one circuit board 74 in alternative embodiments. The display 50 of the user interface 12 is also configured to be received in the component cavity 64 of the upper frame member 32. Other types of electronic components may be received in the component cavities 64, 70 in alternative embodiments depending on the particular application.

The user inputs 14 are configured to be connected to the frame 16, including the user input 14 defined by the touch cover 52. The user inputs 14 are both mechanically and electrically connected to the frame 16. The frame 16 includes a plurality of frame connectors 76 that interface with the user inputs 14 and the circuit board 74. The frame connectors 76 are configured to make electrical contact with the circuit board 74 when the electronic device 10 is assembled. In an exemplary embodiment, the frame connectors 76 make an electrical connection with the circuit board 74 at several interfaces for ease of assembly of the electronic device 10. In an exemplary embodiment, the frame connectors 76 are electrically connected to the circuit board 74 without the use of solder or another type of permanent connection. As such, assembly of the electronic device 10 can be accomplished by simply loading the circuit board 74 into the component cavities 64, 70 of the upper frame member 32 and/or lower frame member 34 such that the circuit board 74 engages the frame connectors 76. When the upper and lower frame members 32, 34 are coupled together, such as by using fasteners or latches, an electrical connection is made between the frame connectors 76 and the circuit board 74. There is no additional soldering step required to electrically connect the frame connectors 76 to the circuit board 74. Additionally, an inexpensive connection may be made between the frame connectors 76 and the circuit board 74, such as by using spring contacts 78 between the circuit board 74 and the frame connectors 76. No additional connectors, such as plug and receptacle connectors, are required between the circuit board 74 and the frame connectors 76.

When assembled, the display 50 is electrically coupled to the circuit board 74. Control signals to control the data displayed by the display 50 are transmitted from the circuit board 74 to the display 50. The user inputs 14 can pick up a signal from anywhere on the electronic device 10 based on an action of touching, handling or placing and process that signal to cause a predetermined effect, such as to affect the display 50. In an exemplary embodiment, the circuit board 74 includes a connector 80 and the display 50 includes a mating connector 82 configured to be mated to the connector 80. Any type of connector and mating connector 80, 82 may be used. For example, the connector 80 and mating connector 82 may constitute plug and receptacle type connectors. Alternatively, the connector 80 and mating connector 82 may be card edge connectors. mezzanine connectors, spring beams and pads, pin and socket type connectors. and the like.

The touch cover 52 constitutes a user input 14a. For example, as noted above, the touch cover 52 is configured to be touched by the operator to control the functionality of the electronic device 10. The touch cover 52 includes one or more tactile sensors 90 along an inner surface 92 of the touch cover 52. The touch cover 52 also includes an outer surface 94 opposite the inner surface 92 that is configured to be touched by the operator. When the touch cover 52 is coupled to the frame 16, the tactile sensors 90 are electrically connected to corresponding frame connectors 76a of the frame 16.

In the illustrated embodiment, the frame 16 includes frame connectors 76a provided on the outer surface 18 of the base 60 of the frame 16. For example, the frame connectors 76a are provided on the front 28 of the frame 16. In an exemplary embodiment, the frame connectors 76a constitute conductive traces provided on the frame 16. Optionally, the conductive traces may be embedded in the body of the frame 16 defining the base 60. The frame connectors 76a include a first interface 96 and a second interface 98. The tactile sensors 90 of the touch cover 52 include one or more terminals 100 that are terminated to the first interface 96. The circuit board 74 is terminated to the second interface 98. In an exemplary embodiment, one or more of the spring contacts 78a are provided between the circuit board 74 and the second interface 98 of the frame connector 76a. The spring contacts 78a define a separable interface between the circuit board 74 and the second interface 98. The frame 16 and corresponding frame connector 76a define an interconnect between the touch cover 52 and the circuit board 74. In an exemplary embodiment, the touch cover 52 is electrically and mechanically coupled to the frame 16 by the interface between the tactile sensors 90 and the first interface 96. Optionally, a conductive epoxy may be used between the tactile sensors 90 and the first interface 96.

In an exemplary embodiment, the tactile sensors 90 are configured to sense a touch event by the operator. Optionally, the tactile sensors 90 may constitute piezoelectric sensors, which may be referred to hereinafter as piezoelectric sensors 90. The piezoelectric sensors 90 are configured to sense a touch event by the operator using a piezoelectric effect. For example, the piezoelectric sensors 90 may generate an electric potential and/or electric signal in response to applied mechanical stress on the touch cover 52. The mechanical stress may be transferred across the interface between the piezoelectric sensors 90 and the inner surface 92. As such, ultrasonic or subsonic energy from the touch cover 52 is transferred to the piezoelectric sensors 90 in the form of pressure that is sensed at the piezoelectric sensor 90. The energy generates an electric potential that is transmitted by the terminals 100 to the frame connector 76a, and the frame connector 76a to the circuit board 74. Having the piezoelectric sensors 90 and the touch cover 52 rigidly held to the frame 16 maintains the transfer of energy across the interface between the piezoelectric sensors 90 and the frame connector 76a. Using a conductive epoxy therebetween also maintains the transfer of electric potential across the interface. As such, an accurate reading of the touch event may be communicated to the circuit board 74 to adjust the display 50.

Other types of tactile sensors 90 may be used in alternative embodiments in addition to, or other than, piezoelectric sensors. For example, capacitive sensors, resistive sensors, magnetic sensors, optical sensors, mechanical sensors and the like may be used to sense touch events by the operator on the touch cover 52. Optionally, the tactile sensor 90 may include a selective conductive coating to capacitively sense touch events. The tactile sensor 90 may be embedded in the touch cover 52. Both a piezoelectric sensor and another type of sensor, such as a capacitive sensor, may be jointly electrically connected to the circuit board via the frame 16, and signals from both may be jointly used to determine a response and/or to adjust the display 50.

In an exemplary embodiment, at least one user input 14b is provided in the upper frame member 32 and at least one user input 14c is provided in the lower frame member 34. The user input 14b is coupled to the rim 62 and/or the base 60 and the user input 14b includes one or more terminal(s) 110 coupled to a corresponding frame connector 76b. The frame connector 76b is a conductive trace routed along the rim 62 and/or the base 60. The frame connector 76b includes a first interface 112 and a second interface 114, which may be at generally opposite ends of the conductive trace. The terminals 110 of the user input 14b are terminated to the first interface 112. The circuit board 74 is terminated to the second interface 114. The frame 16 and corresponding frame connector 76b define an interconnect between the user input 14b and the circuit board 74. In an exemplary embodiment, the user input 14b is electrically and mechanically coupled to the frame 16 by the interface between the terminals 110 and the first interface 112. Optionally, a conductive epoxy may be used between the terminals 110 and the first interface 112.

In an exemplary embodiment, one or more of the spring contacts 78b are provided between the circuit board 74 and the second interface 114 of the frame connector 76b. The spring contacts 78b define a separable interface between the circuit board 74 and the second interface 114. Other types of connections may be made in alternative embodiments between the frame connector 76b of the frame 16 and the circuit board 74. Optionally, the spring contact 78b may be terminated to the circuit board 74 and coupled to the frame connector 76b during assembly of the circuit board 74 into the upper frame member 32. Alternatively, the spring contacts 78b may be terminated to the frame connector 76b and mated to the circuit board 74 during assembly of the circuit board 74 into the upper frame member 32.

The user input 14c is coupled to the rim 68 and/or the base 66 and the user input 14c includes one or more terminal(s) 120 coupled to a corresponding frame connector 76c. The frame connector 76c is a conductive trace routed along the base 66 and/or the rim 68. The frame connector 76c includes a first interface 122 and a second interface 124, which may be at generally opposite ends of the conductive trace. The terminals 120 of the user input 14c are terminated to the first interface 122. The circuit board 74 is terminated to the second interface 124. The frame 16 and corresponding frame connector 76c define an interconnect between the user input 14c and the circuit board 74. In an exemplary embodiment, the user input 14c is electrically and mechanically coupled to the frame 16 by the interface between the terminals 120 and the first interface 122. Optionally, a conductive epoxy may be used between the terminals 120 and the first interface 122.

In an exemplary embodiment, one or more of the spring contacts 78c are provided between the circuit board 74 and the second interface 124 of the frame connector 76c. The spring contacts 78c define a separable interface between the circuit board 74 and the second interface 124. Other types of connections may be made in alternative embodiments between the frame connector 76c of the frame 16 and the circuit board 74. Optionally, the spring contact 78c may be terminated to the circuit board 74 and coupled to the frame connector 76c during assembly of the lower frame member 34 onto the upper frame member 32 or assembly of the circuit board 74 into the lower frame member 34, depending on the assembly process. Alternatively, the spring contacts 78c may be terminated to the frame connector 76c and mated to the circuit board 74 during assembly of the circuit board 74 and/or the lower frame member 34.

Figure 3:
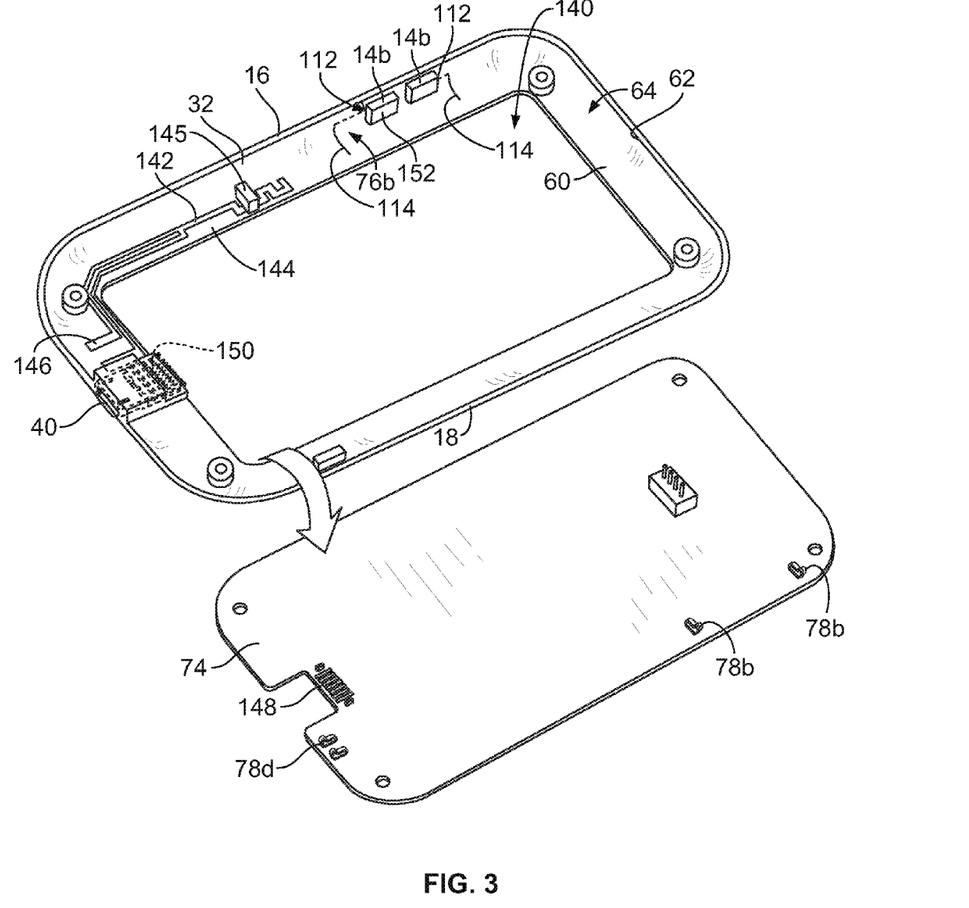
FIG. 3 is an exploded view of a top portion of a frame and a circuit board for the electronic device.

FIG. 3 is a bottom perspective view of the upper frame member 32. The upper frame member 32 includes the base 60 and the rim 62. The upper frame member 32 includes the component cavity 64. In an exemplary embodiment, an opening 140 is provided in the base 66. The opening 140 is configured to receive the display 50 (shown in FIGS. 1 and 2). The opening 140 provides access to the display 50 such that the display 50 may be visible external of the upper frame member 32 to display data to the operator. Optionally, the opening 140 may be sized substantially similar to the display 50. The display 50 may substantially fill the opening 140. Optionally, the display may be coupled to the opening 140 to hold the display 50 in position with respect to the base 60. For example, the display 50 may be snap fit into the opening 140. Alternatively, the upper frame member 32 may include securing features for securing the display 50 with respect to the opening 140 to hold the display 50 in place.

In an exemplary embodiment, the electronic device 10 includes an antenna 142 provided on an inner surface 144 of the upper frame member 32. Optionally, the antenna 142 may be provided on the inner surface 144 of the base 60. The antenna 142 may be provided on the inner surface 144 of the rim 62 in addition to, or alternative to, the base 60. The antenna 142 may be a printed circuit on the inner surface 144 having a predetermined layout and configuration. Alternatively, the antenna 142 may be embedded in the body of the upper frame member 32. Optionally, the antenna 142 may include a tuning device 145 electrically coupled to the antenna 142. The tuning device 145 allows the antenna to be tuned to multiple frequency bands, such as by application of a DC voltage to the antenna 142. Optionally, the DC voltage may be applied to antenna input pads (not shown). The tuning device 145 may include discrete elements or parts directly mounted on the upper frame member 32. Alternatively, the tuning device 145 may have parts or elements mounted on a circuit board mounted on the upper frame member 32. The circuit board may be the circuit board 74. The tuning device 145 may include a tunable capacitive element, such as a barium-strontium-titanate (BST) capacitor, a blocking capacitor and/or an ESD protection device.

The antenna 142 includes mounting pads 146 that are configured to be electrically connected to the circuit board 74. In an exemplary embodiment, one or more spring contact(s) 78d are terminated to the circuit board 74 and are configured to engage the mounting pads 146 when the circuit board 74 is loaded into the component cavity 64 of the upper frame member 32. Alternatively, the spring contacts 78d may be terminated to the mounting pads 146 and configured to engage corresponding pads on the circuit board 74 when the circuit board 74 is loaded into the component cavity 64 of the upper frame member 32. Other types of interconnects are possible between the mounting pads 146 of the antenna 142 and the circuit board 74.

The mating connector 40 is mounted to the upper frame member 32 and is configured for electrical connection to mounting pads 148 on the circuit board 74. The mating connector 40 includes spring contacts 150 that engage the mounting pads 148 when the circuit board 74 is loaded into the component cavity 64 of the upper frame member 32. The spring contacts 150 are biased against the mounting pads 148 to ensure electrical contact therebetween. As such, the mating connector 40 is configured to be electrically connected to the circuit board 74 at a separable interface. The mating connector 40 is mechanically secured within the upper frame member 32 prior to assembly of the circuit board 74 into the upper frame member 32. As such, the mating connector 40 may be securely held within the upper frame member 32 and may be sealed to the upper frame member 32 in a cost effective and reliable manner. For example, the mating connector 40 may be provided with electro-static discharge (ESD) protection, electro-magnetic interference (EMI) shielding and/or waterproofing. Because the mating connector 40 is integrated into the upper frame member 32, as opposed to being terminated to the circuit board 74, the ESD protection, EMI shielding and/or waterproofing may be made in a reliable manner. Additionally, the ESD protection, EMI shielding and/or waterproofing may be made prior to the circuit board 74 being assembled into the upper frame member 32, which may allow more room for assembly, which may make assembly easier.

The user inputs 14b are coupled to the rim 62 and/or the base 60 independent of the circuit board 74. The user inputs 14b are coupled to the upper frame member 32 in an assembly step separate from the circuit board 74 being coupled to the upper frame member 32. The user inputs 14b may be rigidly held to the rim 62 and/or base 60 using a conductive epoxy such that the user inputs 14b are rigidly held against the inner surface 144 of the upper frame member 32. Other types of user inputs 14 may additionally, or alternatively, be integrated into the upper frame member 32. In an exemplary embodiment, the user inputs 14b are piezoelectric sensors, and may be referred to hereinafter as piezoelectric sensors 14b. The piezoelectric sensors 14b generate an electric field or electric potential in response to applied mechanical stress on the upper frame member 32. For example, pressure, such as ultrasonic or subsonic energy, imparted onto the upper frame member 32, such as on the rim 62 proximate to the piezoelectric sensors 14b, is transferred through the body of the upper frame member 32 directly to the piezoelectric sensors 14b. Having the piezoelectric sensors 14b mechanically secured to the inner surface 144 of the upper frame member 32 maintains the energy the interface therebetween. Tight coupling of the piezoelectric sensors 14b to the upper frame member 32 maintains energy transfer across the interface. For example, epoxy or a conductive epoxy may be used to secure the piezoelectric sensors 14b to the inner surface 144. Other types of user inputs 14b may be provided in alternative embodiments, rather than or in addition to, piezoelectric sensors, to define tactile sensors. For example, the user inputs 14b may be capacitive sensors, resistive sensors, magnetic sensors, optical sensors, mechanical sensors and the like in alternative embodiments. Both a piezoelectric sensor and another type of sensor, such as a capacitive sensor, may be jointly electrically connected to the circuit board via the frame 16, and signals from both may be jointly used to determine a response and/or to adjust the display 50.

The user inputs 14b may be provided anywhere along the inner surface 144, such as in locations designated for a particular functionality. For example, volume control scrolling, navigation or movement, activation or deactivation, or other functionality may be provided by the particular user inputs 14b. Indicia, such as the indicia 36, 38 (Shown in FIG. 1) may be provided on the outer surface 18 of the upper frame member 32 opposite of the user inputs 14b. The indicia 36, 38 may indicate to the operator the function provided by the user inputs 14b. The user inputs 14b thus operate as virtual buttons or controllers for the electronic device 10. For example, the user inputs 14b are not physically touched by the operator, but rather the user inputs 14b sense when the operator touches a particular area of the upper frame member 32 to control the functionality of the electronic device 10.

In an exemplary embodiment, the user inputs 14b include a transducer 152 and the terminals 110 (shown in FIG. 2). The terminals 110 are terminated to the corresponding frame connector 76b. The frame connector 76b is routed along the inner surface 144 of the upper frame member 32 to an appropriate location for mating connection with the circuit board 74. For example, the frame connector 76b may constitute a conductive trace routed on the inner surface 144 to a location on the base 60 designated for connection to the circuit board 74.

The frame connector 76b includes the first interface 112 and the second interface 114. The terminals 110 of the user input 14b are terminated to the first interface 112. The circuit board 74 is terminated to the second interface 114. For example, the spring contacts 78b may be provided between the circuit board 74 and the second interface 114 to terminate the circuit board 74 to the second interface 114. The spring contacts 78b define a separable interface between the circuit board 74 and the second interface 114. Other types of connections may be made in alternative embodiments between the frame connector 76b of the frame 16 and the circuit board 74. Optionally, the spring contact 78b may be terminated to the circuit board 74 and coupled to the frame connector 76b during assembly of the circuit board 74 into the upper frame member 32. Alternatively, the spring contacts 78b may be terminated to the frame connector 76b and mated to the circuit board 74 during assembly of the circuit board 74 into the upper frame member 32.

The frame 16 and corresponding frame connector 76b define an interconnect between the user input 14b and the circuit board 74. In an exemplary embodiment, the user input 14b is electrically and mechanically coupled to the frame 16 by the interface between the terminals 110 and the first interface 112. Optionally, a conductive epoxy may be used between the terminals 110 and the first interface 112.

Figure 4:
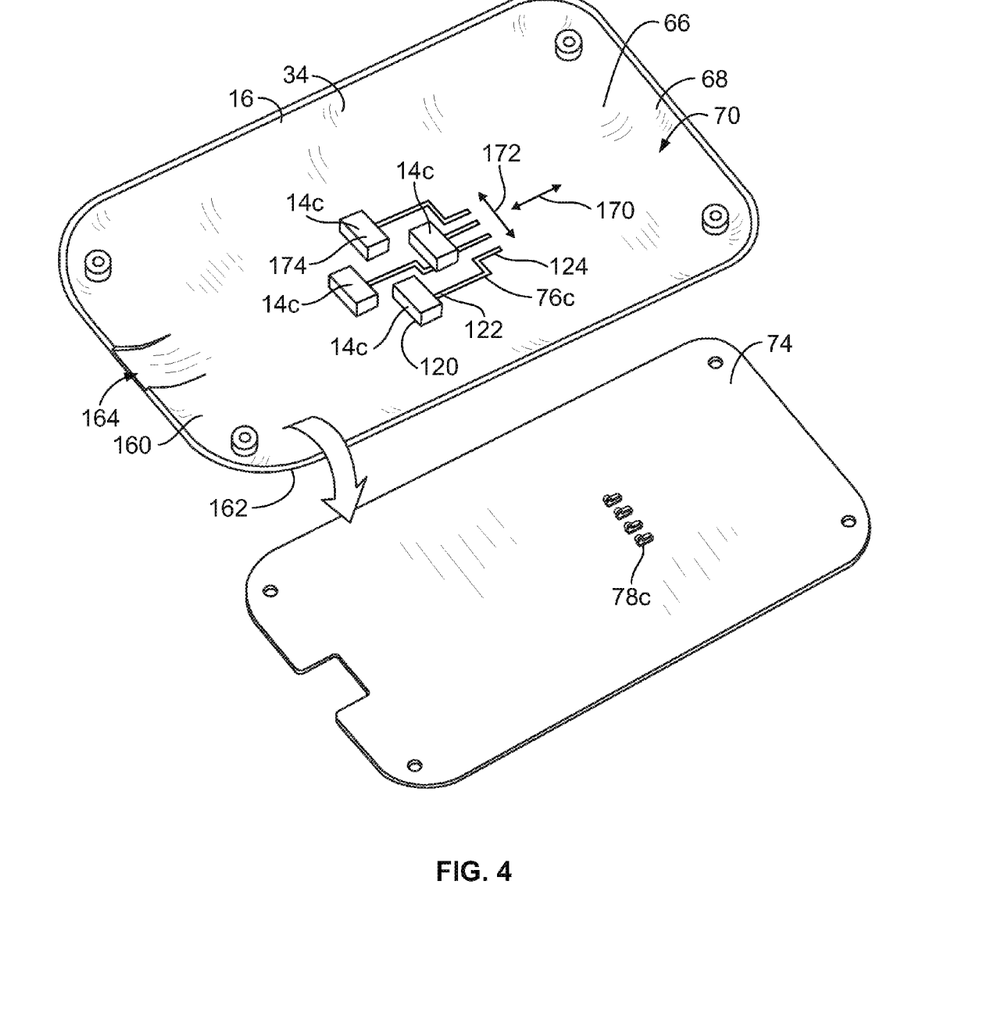
FIG. 4 is a top perspective view of a bottom portion of a frame for the electronic device.

FIG. 4 is a top perspective view of the lower frame member 34. The lower frame member 34 includes the base 66 and the rim 68. The lower frame member 34 includes the component cavity 70. The lower frame member 34 includes an inner surface 160 and an outer surface 162. The outer surface defines the outer surface of the frame 16 and is configured to be held and touched by the operator. The lower frame member 34 includes an opening 164 through the rim 68 that accommodates the mating connector 40 (shown in FIGS. 2 and 3) when the lower frame member 34 is coupled to the upper frame member 32.

The user inputs 14c are coupled to the base 66 independent of the circuit board 74. Optionally, the user inputs 14c may be coupled to the rim 68 in addition to, or in the alternative to, the base 66. The user inputs 14c are coupled to the lower frame member 34 independent of the circuit board 74. The user inputs 14c may he rigidly held to the base 60 using a conductive epoxy such that the user inputs 14c are rigidly held against the inner surface 160 of the lower frame member 34. Other types of user inputs 14 may additionally, or alternatively, be integrated into the lower frame member 34. In an exemplary embodiment, the user inputs 14c are piezoelectric sensors, and may be referred to hereinafter as piezoelectric sensors 14c. The piezoelectric sensors 14c generate an electric field or electric potential in response to applied mechanical stress on the lower frame member 34. For example, pressure, such as ultrasonic or subsonic energy, imparted onto the lower frame member 34, such as on the base 66 proximate to the piezoelectric sensors 14c, is transferred through the body of the lower frame member 34 directly to the piezoelectric sensors 14c. Having the piezoelectric sensors 14c mechanically secured to the inner surface 160 of the lower frame member 34 maintains the energy the interface therebetween. Tight coupling of the piezoelectric sensors 14c to the lower frame member 34 maintains energy transfer across the interface. For example, epoxy or a conductive epoxy may be used to secure the piezoelectric sensors 14c to the inner surface 160. Other types of user inputs 14c may be provided in alternative embodiments, rather than, or in addition to, piezoelectric sensors, to define tactile sensors. For example, the user inputs 14c may be capacitive sensors, resistive sensors, magnetic sensors, optical sensors, mechanical sensors and the like in alternative embodiments. Both a piezoelectric sensor and another type of sensor, such as a capacitive sensor, maybe jointly electrically connected to the circuit board via the frame 16, and signals from both may be jointly used to determine a response and/or to adjust the display 50.

The user inputs 14c may be provided anywhere along the inner surface 160, such as in locations designated for a particular functionality. For example, in the illustrated embodiment, the user inputs 14c are substantially centrally positioned on the base 66 in an array to sense movement of the operator's finger along the outer surface 162 of the base 66. As such, the user inputs 14c cooperate to define a navigation or movement sensor similar to a mouse or scroll device. The user inputs 14c sense movement of the user's finger in one or more directions, such as in a longitudinal direction 170 and a lateral direction 172. Such movement may translate into movement of a cursor on the display 50 (shown in FIG. 1), movement of icons within the display 50, or other types of movements or functions. Indicia may be provided on the outer surface 162 of the lower frame member 34 opposite of the user inputs 14c. The indicia may indicate to the operator the function provided by the user inputs 14c. The user inputs 14c thus operate as virtual buttons or controllers for the electronic device 10. For example, the user inputs 14c are not physically touched by the operator, but rather the user inputs 14c sense when the operator touches a particular area of the lower frame member 34 to control the functionality of the electronic device 10.

In an exemplary embodiment, the user inputs 14c include a transducer 174 and the terminals 120. The terminals 120. are terminated to the corresponding frame connectors 76c. The frame connectors 76c are routed along the inner surface 160 of the lower frame member 34 to an appropriate location for mating connection with the circuit board 74. For example, the frame connector 76c may constitute a conductive trace routed on the inner surface 160 to a location on the base 66 designated for connection to the circuit board 74. Optionally, each of the frame connectors 76c may be routed to the same general area for connection to the circuit board 74.

Each frame connector 76c includes the first interface 122 and the second interface 124. The terminals 120 of the user input 14c are terminated to the first interface 122. The circuit board 74 is terminated to the second interface 124. For example, the spring contacts 78c may be provided between the circuit board 74 and the second interface 124 to terminate the circuit board 74 to the second interface 124. The spring contacts 78c define a separable interface between the circuit board 74 and the second interface 124. Other types of connections may be made in alternative embodiments between the frame connectors 76c of the frame 16 and the circuit board 74. Optionally, the spring contacts 78c may be terminated to the circuit board 74 and coupled to the frame connectors 76c during assembly of the lower frame member 34 onto the upper frame member 32. Alternatively, the spring contacts 78c may be terminated to the frame connectors 76c and mated to the circuit board 74 during assembly of the lower frame member 34 onto the upper frame member 32.

The frame 16 and corresponding frame connectors 76c define an interconnect between the user input 14c and the circuit board 74. In an exemplary embodiment, the user input 14c is electrically and mechanically coupled to the frame 16 by the interface between the terminals 120 and the first interface 112. Optionally, a conductive epoxy may be used between the terminals 120 and the first interface 122.

Figure 5:
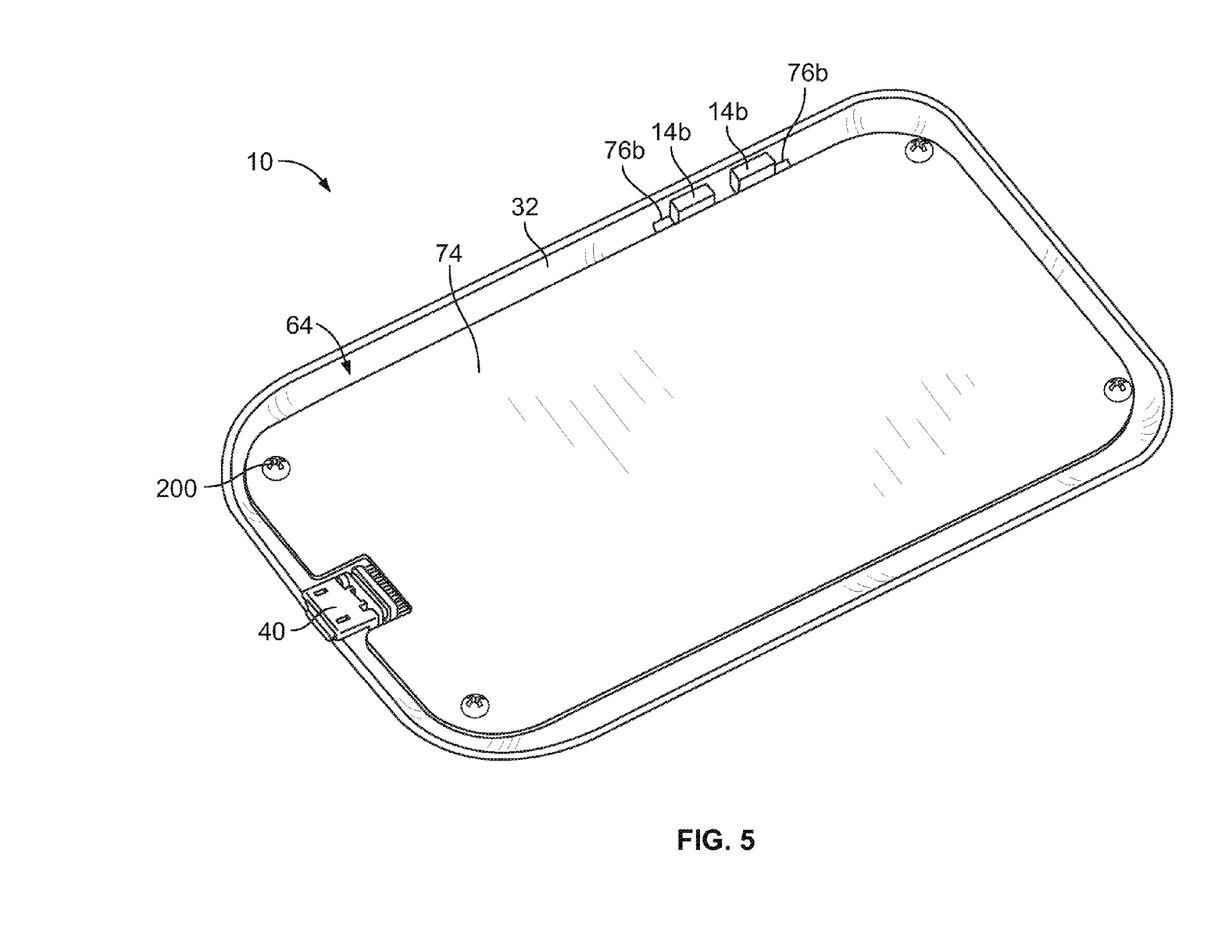
FIG. 5 illustrates the electronic device partially assembled.

FIG. 5 illustrates the electronic device 10 partially assembled, with the circuit board 74 loaded into the upper frame member 32. During assembly, the circuit board 74 is loaded into the component cavity 64 of the upper frame member 32. The circuit board 74 is secured in place using fasteners 200. As the circuit board 74 is being loaded into the upper frame member 32, the circuit board 74 makes electrical connections to the user inputs 14, such as the user inputs 14b shown in FIG. 5, the mating connector 40, the antenna 142 (shown in FIG. 3), and any other components integrated into the upper frame member 32. Tightening of fasteners 200 pulls the circuit board 74 into engagement with the frame connectors 76, such as the frame connectors 76b shown in FIG. 5. When spring contacts 78 (shown in FIG. 3) are provided between the frame connectors 76 and the circuit board 74, the spring contacts 78 are compressed, which biases the spring contacts 78 against the frame connectors 76 or corresponding mounting pads on the circuit board 74. Such biasing force ensures good electrical contact between the circuit board 74 and the frame connectors 76. As such, the upper frame member 32 is utilized as an integrated connector that integrates multiple electrical components into the upper frame member 32 and provides mating interfaces for mating with the circuit board 74 when the circuit board 74 is loaded into the component cavity 64.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An electronic device comprising:
a frame defining a component cavity configured to receive a circuit board, the frame comprising a conductive trace deposited on a surface of the frame, the frame and conductive trace defining a frame connector being configured to be coupled to the circuit board at a separable interface, wherein the frame is configured to support a user interface that is visible external of the frame to display data to an operator; and
a user input coupled to the frame, the user input having a terminal electrically coupled to the frame connector, wherein a signal from the user input is transferred to the user interface via the trace of the frame connector.

2. The electronic device of claim 1, wherein the user input is integrated into the frame and is supported by a mechanical connection to the frame independent of the circuit board.

3. The electronic device of claim 1, wherein the trace is routed along the surface of the frame, the trace having at least a first interface and a second interface, the user input being terminated to the first interface, the second interface being configured to be terminated to the circuit board.

4. The electronic device of claim 1, wherein the frame includes an outer surface and an inner surface, the outer surface defining an outer surface of the electronic device configured to be held by an operator during use of the electronic device, the inner surface defining the component cavity, the conductive trace being deposited directly on at least one of the outer surface and the inner surface.

5. The electronic device of claim 1, wherein the user input comprises a tactile sensor configured to sense a touch event by the operator.

6. The electronic device of claim 1, wherein the user interface comprises a piezoelectric sensor rigidly held against the frame, energy imparted onto the frame by an operator is transferred through the frame directly to the piezoelectric sensor.

7. The electronic device of claim 1, wherein the user input is coupled to the frame connector by a conductive epoxy.

8. The electronic device of claim 1, further comprising a mating connector having a mating interface and a plurality of mating contacts, the mating connector being coupled to the frame, the mating contacts defining a separable interface for mating to the circuit board.

9. The electronic device of claim 1, further comprising an antenna defined by conductive traces deposited on the frame, the conductive traces having mounting pads, the mounting pads being configured to be electrically connected to the circuit board by spring contacts held between the mounting pads and the circuit board.

10. The electronic device of claim 1, further comprising an antenna defined by conductive traces deposited on the frame, the antenna being configured to be electrically connected to the circuit board, the antenna having a tuning device.

11. The electronic device of claim 1, wherein the user input comprises a transducer mounted to an inner surface of the frame, the transducer sensing a touch event at an outer surface of the frame proximate to the transducer.

12. An electronic device comprising:
a frame having a base and a rim extending from the base, the rim defining sidewalls of the frame, the frame having a component cavity bounded by the base and the rim, the component cavity being configured to receive a circuit board therein, the frame having a conductive trace deposited on at least one of the base or the rim, the frame and conductive trace defining a frame connector, the frame connector being configured to be electrically connected to the circuit board at a separable interface; and
a user interface coupled to the frame, the user interface having a display and a touch cover overlying the display, the display being visible through the touch cover external of the frame, the display being configured to display data to an operator, the touch cover defining a user input having a terminal electrically connected to the trace of the frame connector, wherein a signal from the user input is configured to be transferred to the circuit board via the trace of the frame connector.

13. The electronic device of claim 12, wherein the user interface includes a tactile sensor between the touch cover and the frame, the tactile sensor being electrically connected to the frame connector, the tactile sensor configured to sense a touch event on the touch cover by the operator.

14. The electronic device of claim 12, wherein the conductive trace is routed along a surface of the frame, the trace having a first interface and a second interface, the touch cover including a selective conductive coating to capacitively sense being electrically terminated to the first interface, the second interface being configured to be electrically terminated to the circuit board.

15. The electronic device of claim 12, wherein the frame connector includes a first interface and a second interface, the first interface being provided on an outer surface of the frame connector and engaging the touch cover, the second interface being provided on an inner surface of the frame connector and being configured to be electrically terminated to the circuit board.

16. The electronic device of claim 12, wherein the user interface comprises a piezoelectric sensor rigidly held against the frame, energy imparted onto the touch cover by the operator is transferred through the touch cover directly to the piezoelectric sensor.

17. The electronic device of claim 12, wherein both a piezoelectric and selectively coated touch cover are jointly electrically connected to the circuit board and signals from the piezoelectric touch cover and the selectively coated touch cover are jointly used to determine a response.

18. An electronic device comprising:
a frame having a base and a rim extending from the base, the rim defining sidewalls of the frame, the frame having a component cavity bounded by the base and the rim, the component cavity being configured to receive a circuit board, the frame having a conductive trace deposited on at least one of the base or the rim, the frame and conductive trace defining a frame connector, the conductive trace of the frame connector being configured to be electrically connected to the circuit board at a separable interface;
a tactile sensor coupled to at least one of the base or the rim of the frame, the tactile sensor comprising a transducer and a terminal electrically connected to the trace of the frame connector, wherein input from the tactile sensor is configured to be transferred to the circuit board via the trace of frame connector.

19. The electronic device of claim 18, wherein the tactile sensor is integrated into the frame and is supported by a mechanical connection to the frame independent of the circuit board.

20. The electronic device of claim 18, wherein the trace is routed along a surface of the frame, the trace having a first interface and a second interface, the tactile sensor being terminated to the first interface, the second interface being configured to be electrically terminated to the circuit board.

21. The electronic device of claim 18, wherein the tactile sensor comprises a piezoelectric sensor rigidly held against the frame, energy imparted onto the frame by the operator is transferred through the frame directly to the piezoelectric sensor.

22. The electronic device of claim 18, wherein the frame includes an outer surface and an inner surface, the outer surface defining an outer surface of the electronic device, the inner surface defining the component cavity, the tactile sensor being mechanically connected to the inner surface, the operator being configured to touch the outer surface, wherein applied mechanical stress on the outer surface is transferred through the frame to generate an electric potential at the tactile sensor.

23. The electronic device of claim 18, wherein the frame includes an outer surface and inner surface, the outer surface defining an outer surface of the electronic device, the inner surface defining the component cavity, the tactile sensor being mechanically connected to the inner surface, the tactile sensor being one of a piezoelectric sensor, a capacitive sensor or a resistive sensor defining a touch surface, the tactile sensor being configured to be electrically connected to the circuit board through the frame, wherein upon detection of a touch event, the tactile sensor transmits an electrical signal to the circuit board via the frame connector.

* * * * *